July 18, 1944.  J. L. HAYNES  2,354,016

CAR TRUCK CONSTRUCTION

Filed June 3, 1941  2 Sheets-Sheet 1

INVENTOR:
JAMES L. HAYNES,
BY Romeyn A. Spar
HIS ATTORNEY.

July 18, 1944.  J. L. HAYNES  2,354,016
CAR TRUCK CONSTRUCTION
Filed June 3, 1941   2 Sheets-Sheet 2

INVENTOR:
JAMES L. HAYNES,
BY Romeyn A. Spare
HIS ATTORNEY.

Patented July 18, 1944

2,354,016

UNITED STATES PATENT OFFICE 2,354,016

CAR TRUCK CONSTRUCTION

James L. Haynes, Glen Ellyn, Ill., assignor to General Motors Corporation, Detroit, Mich., a corporation of Delaware Application June 3, 1941, Serial No. 396,419

10 Claims. (Cl. 105—182)

This invention relates to car truck construction and comprises all of the features and aspects of novelty herein disclosed. An object of the invention is to provide an improved flexible truck. Another object is to provide a flexible truck especially applicable to ingot cars. Another object is to provide a car truck wherein rocking side frames which can approach and recede from one another are tied together by axles and self aligning bearings.

To these ends and also to improve generally upon devices of the character indicated, the invention consists in the various matters hereinafter described and claimed. In its broader aspects, the invention is not necessarily limited to the construction selected for illustrative purposes in the accompanying drawings in which Fig. 1 is a plan view, the car body being removed and the outline of the bolster appearing in broken lines.

Figure 1:
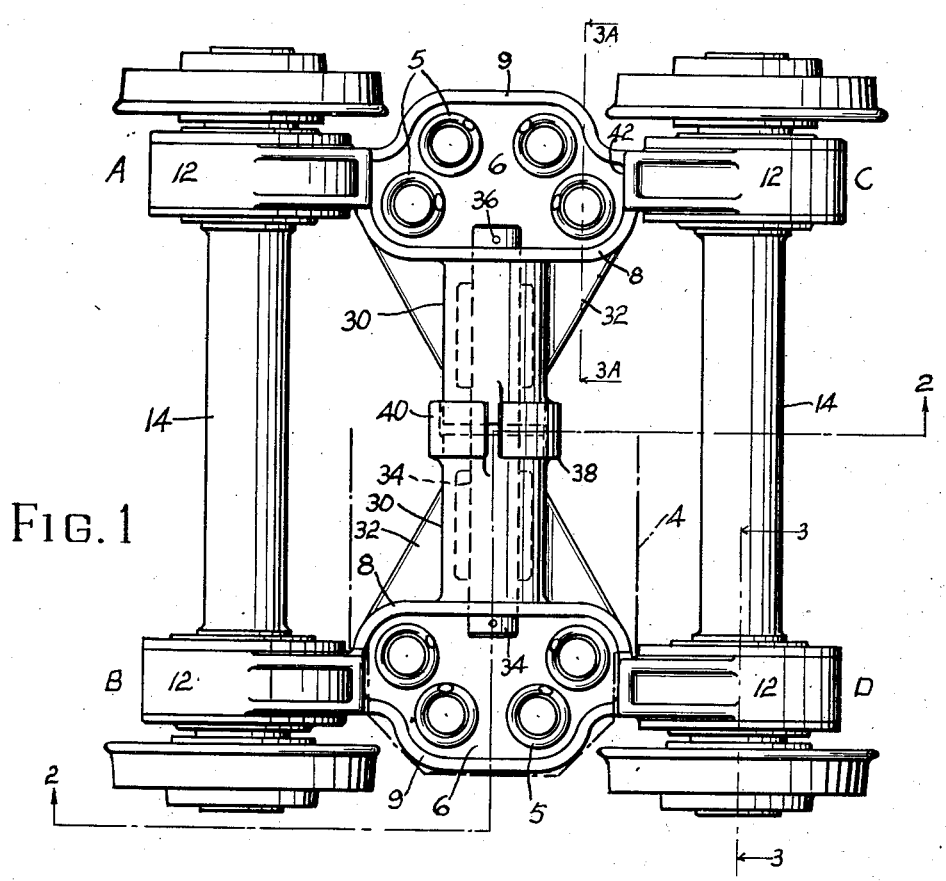
Figure 2:
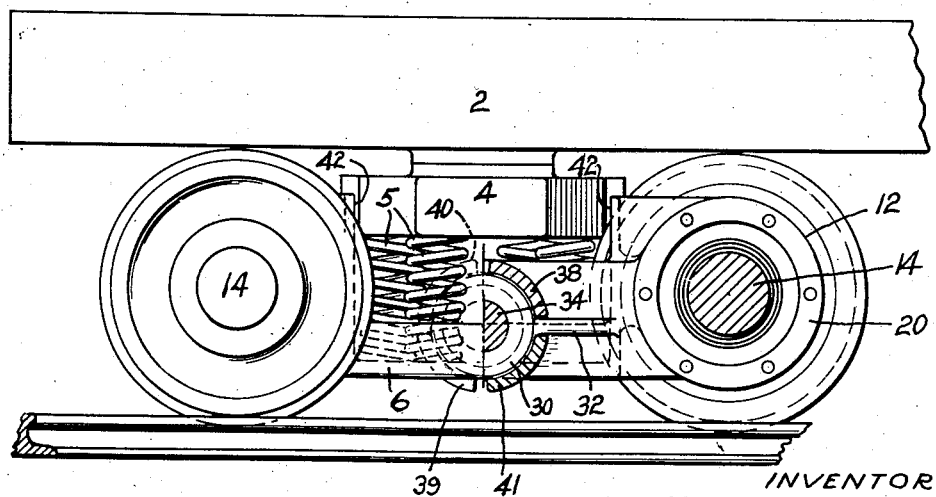
Fig. 2 is one half a side view and one half a cross section in the plane of line 2—2 in Fig. 1 looking in the direction of the arrows.
Figure 3:
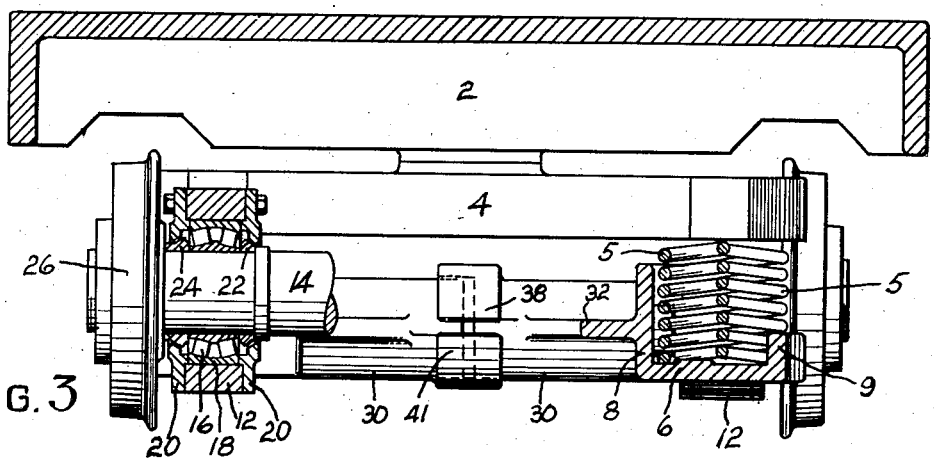
Fig. 3 is one half a section on the line 3—3 and one half a section on the line 3A—3A of Fig. 1.
Figure 4:
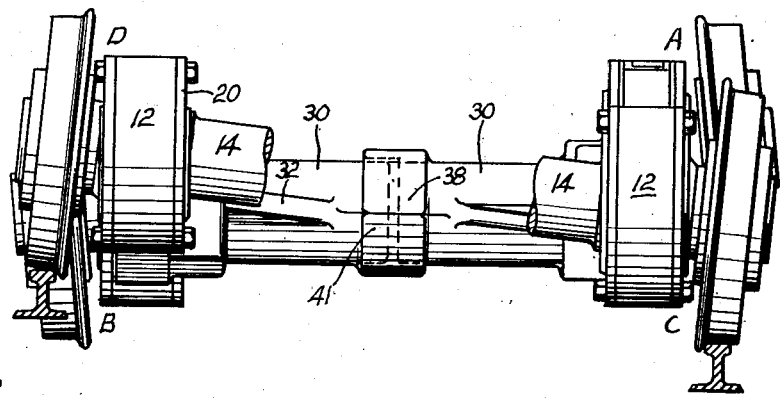
Fig. 4 is an end view showing two opposite corners of the frame lifted a maximum amount, a portion of one axle being broken away to show the limiting means.
Figure 5:
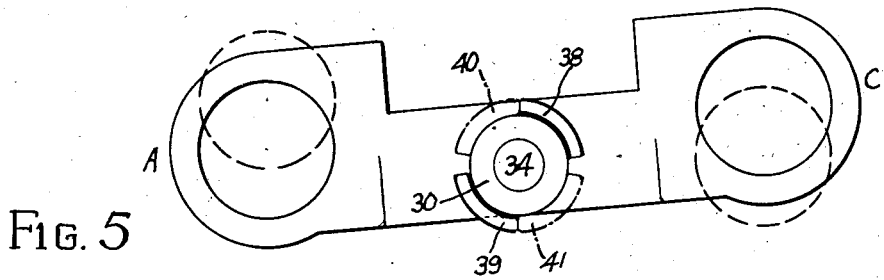
Fig. 5 is a diagrammatic view showing one side frame tilted and indicating by broken lines the position of the axle bearings when the other side frame is tilted.

The body 2 of the car rests on a bolster 4 supported at each end by a set of coil springs 5. Each set of springs rests on a wide low platform 6 bounded by upright walls or flanges 8 and 9 and formed as a part of a side frame. Each side frame has at each end a ring-like housing 12 which encircles an axle 14 and a self-aligning roller bearing 16. Each bearing is preferably a double-row barrel roller bearing having its outer race ring 18 clamped in the housing by annular projections on caps 20 bolted to the sides of the housing. The inner race ring of each bearing is clamped between spacers 22 and 24, the spacer 22 abutting against a collar on the axle, and the spacer 24 abutting against the hub of a wheel 26 which is fastened to the axle. The outer race ring 18 has a spherical raceway so that the axle and frame can rock or tilt with respect to one another as when the tracks are not on the same level or otherwise uneven. To protect the bearing and allow relative rocking, the inner edges of the caps 20 and the outer surfaces of the spacers 22 and 24 are concentric with the geometric center of the bearing. Suitable seals may be interposed.

Each side frame has a central tubular projection 30 projecting towards a similar projection on the opposite side frame, the projections being braced by horizontal webs 32. The adjacent ends of the projections do not abut against one another when the side frames are in a normal spaced position and the lost-motion space between the projections allows the side frames to approach one another to a limited extent and to subsequently recede. The adjacent projections surround a horizontal hinge pin 34 which projects through the walls 8 of the side frames and is free for a slight endwise movement limited by pins 36. The hinge pin allows the side frames to rock with respect to one another as needed to accommodate or compensate for uneven track conditions. The rocking movement is limited by mating pairs of arcuate lugs 38, 39, 40 and 41 concentric with the hinge pin and formed as extensions of the tubular projections 30. The lugs on each projection 30 overlap the adjacent projection. Adjacent lugs interdigitate and are normally spaced apart a few degrees, each lug being less than a quadrant in angular extent. Lugs 38 and 39 are diametrically opposite and on the far side frame while lugs 40 and 41 are similarly located on the near side frame.

If now the end B of the near side frame and the end C of the far side frame are raised equally to thereby rock the side frames around the hinge pin in opposite directions, the upper lugs 38 and 40 will ultimately abut against one another above the vertical center line. Similarly the lower lugs 39 and 41 will engage below the center line. If the end A of the far side frame and the end D of the near side frame are raised, the upper lug 38 will ultimately engage the lower lug 41 at the horizontal center. Similarly, the lugs 39 and 40 will engage one another at the horizontal center on the other side of the hinge pin.

It will be observed that the self aligning bearings not only allow relative rocking movement between the side frames and the axle but that they will also resist endwise or axial thrust loads. Hence, the axles and the bearings tie the opposite ends of the side frames together at a fixed distance apart. If the wheels on one side of the truck are lifted equally, the side frames keep their normal spacing but in an inclined plane instead of a horizontal plane. If one of the side frames rocks on the hinge pin, or if both side frames rock in opposite directions on the hinge pin, the middle portions of the side frames approach each other slightly as allowed for by the space between the adjacent ends of the tubular projections 30. The side frames are compelled to remain in parallel planes because each tubular projection 30 is integral with its side frame and is held concentric with the mating projection by the close fitting hinge pin 34. The outer pair of springs 5 and the inner pair are equally spaced from the center line of the side frame and the bearing housings 12, and so apply the load to the center of the bearings. The flexible construction insures equal loading on all four wheels and requires less space and head room than other constructions. The central portion of each side frame has a dropped or U-shaped portion between vertical walls 42 to receive and guide the spring supported bolster 4. The spring platform 6 is low and the body 2 may be recessed above the wheels to decrease its height above the tracks.

I claim:

1. In a device of the character indicated, a pair of opposite side frames having bearing housings rigid with the ends thereof, a thrust resisting bearing of the self aligning type having its outer race ring secured in each housing against axial movement, and a wheeled axle journalled for rotation in opposite bearings and fixed to the inner race members thereof to tie the corresponding ends of the side frames together at a fixed distance apart while providing for rocking movement of the axles in vertical planes to out-of-parallel relation.

2. In a device of the character indicated, a pair of opposite side frames each having bearing housings at its ends, a self aligning bearing secured in each housing, a wheeled axle journalled for rotation in opposite bearings and fixed against axial movement with respect to the bearing to tie the corresponding ends of the side frames together at a fixed distance apart, and means for mounting the middle portions of the side frames for relative rocking movement on a horizontal axis and for relative movement of approach which said ends are so held at a fixed distance apart with the axles tiltable in vertical planes to out-of-parallel relation.

3. In a device of the character indicated, a pair of opposite side frames each having a bearing housing at its ends, a self aligning bearing secured in each housing, wheeled axles journalled for rotation in opposite bearings and held against axial movement with respect to the bearings to tie the corresponding ends of the side frames flexibly but positively together at a fixed distance apart, the side frames having central projections extending towards one another and hinged together on a horizontal axis for relative rocking movement with approach and recession.

4. In a device of the character indicated, a pair of opposite side frames each having a bearing housing at its ends, a thrust resisting self aligning bearing having its outer race ring secured in each housing, wheeled axles journalled for rotation in opposite bearings and fixed to the inner race ring of the bearing to tie the ends of the side frames together at a fixed distance apart, the side frames having central tubular projections extending towards each other without endwise contact, and a hinge pin extending horizontally into said tubular projections.

5. In a device of the character indicated, a pair of opposite side frames, wheeled axles journalled in the side frames and tying them together, the side frames having central tubular projections extending towards each other, a hinge pin fitting in said tubular projection, and arcuate lugs extending in pairs from each projection and interdigitating, the ends of adjacent arcuate lugs normally being angularly spaced to provide for a positively limited rocking movement of the side frames on the hinge pin.

6. In a device of the character indicated, a pair of opposite side frames, wheeled axles journalled in said side frames and tying them together, the side frames having central tubular projections extending towards each other, and arcuate lugs extending in pairs from each projection and closely surrounding the end portion of the opposite projection, the adjacent arcuate lugs having an angular extent slightly less than a quadrant.

7. In a device of the character indicated, a pair of opposite side frames, a wheeled axles journalled for rotation in the side frames and tying their ends at a fixed distance apart, the side frames having central tubular projections extending towards each other without endwise contact, a hinge pin fitting in said tubular projections and holding the side frames in parallel planes with provision for approach and recession, and overlapping extensions on the tubular projections for limiting relative rocking movement of the side frames about the axis of the hinge pin.

8. In a device of the character indicated, a pair of opposite side frames each having a bearing housing rigid with the ends thereof, an anti-friction bearing of self-aligning type secured in each housing, wheeled axles journalled in opposite bearings and tying the bearings together against separation or approach, the side frames having central dropped portions providing a low spring platform and guides, the dropped portions having extensions projecting towards each other without endwise contact, the extensions being hinged together to hold the side frames parallel and provide for relative rocking movement thereof with approach and recession of the extensions, and a spring supported bolster guided by said dropped portions.

9. In a device of the character indicated, a pair of opposite side frames hinged together at their central portions for relative rocking movement in vertical planes with provision for approach and recession of said central portions, wheeled axles tying the ends of the side frames together at a fixed distance apart while rockably connected thereto to tilt in vertical planes, each connection comprising a self-aligning anti-friction bearing having its outer race ring rigidly secured to one end of a side frame and having its inner race ring rigidly secured to the axle.

10. In a device of the character indicated, a pair of relatively rockable side frames hinged together at their central portions for relative rocking in vertical planes, and means for tying the ends of the side frames at a fixed distance apart, said means comprising a pair of rotary wheeled axles, and self aligning bearings in which the axles rotate and which provide for tilting movement of the axles to inclined positions out of parallelism, the bearings being fixed against axial movement with respect to both the side frames and the axles.

JAMES L. HAYNES.

CERTIFICATE OF CORRECTION.

Patent No. 2,354,016.                                               July 18, 1944.

JAMES L. HAYNES.

It is hereby certified that error appears in the printed specification of the above numbered patent requiring correction as follows: Page 1, second column, line 48, after "loads" strike out the comma and insert instead a period; page 2, first column, line 46, claim 2, for "which" read --while--; and second column, line 21, claim 7, before the word "wheeled" strike out "a"; and that the said Letters Patent should be read with this correction therein that the same may conform to the record of the case in the Patent Office.

Signed and sealed this 22nd day of August, A. D. 1944.

Leslie Frazer (Seal)                                        Acting Commissioner of Patents.